(12) United States Patent
Allochis

(10) Patent No.: US 9,814,183 B2
(45) Date of Patent: Nov. 14, 2017

(54) BELT SEALING CROP DEFLECTOR FOR A FLEXIBLE DRAPER PLATFORM

(71) Applicant: Jose Luis Allochis, Buenos Aires (AR)

(72) Inventor: Jose Luis Allochis, Buenos Aires (AR)

( * ) Notice: Subject to any disclaimer, the term of this patent is extended or adjusted under 35 U.S.C. 154(b) by 0 days.

(21) Appl. No.: 15/437,007

(22) Filed: Feb. 20, 2017

(65) Prior Publication Data

US 2017/0156264 A1   Jun. 8, 2017

Related U.S. Application Data

(63) Continuation of application No. 14/698,133, filed on Apr. 28, 2015, now Pat. No. 9,591,802.

(51) Int. Cl.
| | |
|---|---|
| *A01D 57/20* | (2006.01) |
| *A01D 57/26* | (2006.01) |
| *A01D 34/18* | (2006.01) |
| *A01D 34/14* | (2006.01) |
| *A01D 61/02* | (2006.01) |
| *A01D 41/14* | (2006.01) |
| *A01D 34/04* | (2006.01) |
| *A01D 61/00* | (2006.01) |
| *A01D 101/00* | (2006.01) |

(52) U.S. Cl.
CPC .............. *A01D 61/02* (2013.01); *A01D 34/04* (2013.01); *A01D 34/14* (2013.01); *A01D 41/14* (2013.01); *A01D 61/002* (2013.01); *A01D 2101/00* (2013.01)

(58) Field of Classification Search
CPC ........ A01D 34/18; A01D 34/20; A01D 34/22; A01D 34/015; A01D 34/14; A01D 57/20; A01D 57/26; A01D 61/02

USPC ................. 56/14.4, 296, 14.5, 158–159, 301
See application file for complete search history.

(56) References Cited

U.S. PATENT DOCUMENTS

| | | | | |
|---|---|---|---|---|
| 3,866,400 | A * | 2/1975 | May ...................... | A01D 57/26 56/158 |
| 4,198,803 | A * | 4/1980 | Quick .................... | A01D 34/13 56/296 |
| 4,722,172 | A * | 2/1988 | Pearce ................... | A01D 34/13 56/14.4 |
| 6,351,931 | B1 * | 3/2002 | Shearer .................. | A01D 57/20 56/14.5 |
| 7,373,769 | B2 * | 5/2008 | Talbot .................... | A01D 34/14 56/296 |
| 7,412,816 | B2 * | 8/2008 | Coers .................... | A01D 61/002 56/208 |
| 7,836,671 | B2 * | 11/2010 | Sauerwein ............. | A01D 41/14 56/296 |
| 7,908,836 | B1 * | 3/2011 | Rayfield ................ | A01D 57/20 56/181 |

(Continued)

*Primary Examiner* — John G Weiss
(74) *Attorney, Agent, or Firm* — Defillo & Associates, Inc.; Evelyn A Defillo

(57) ABSTRACT

The present invention relates to a belt guard assembly suitable for the harvesting platforms of the type that are carried on the front end of an agricultural combine. More specifically, belt guard assembly covers the void region at the front margin of the draper conveyor system and seals it against the entry of crop residue and foreign objects. The belt guard assembly is provided with a resilient seal strip that overlaps with the upper belt run, and with a rotary joint to permit flexibility between the cutterbar assembly and the draper conveyor.

1 Claim, 13 Drawing Sheets

(56) References Cited

U.S. PATENT DOCUMENTS

| | | | | |
|---|---|---|---|---|
| 7,921,627 | B2* | 4/2011 | Sauerwein | A01D 41/14 56/181 |
| 8,484,939 | B1* | 7/2013 | Cormier | A01D 41/14 56/158 |
| 8,511,050 | B1* | 8/2013 | Cormier | A01D 41/14 56/158 |
| 8,555,607 | B2* | 10/2013 | Coers | A01D 41/14 56/158 |
| 9,338,941 | B2* | 5/2016 | Herringshaw | A01D 34/40 |
| 2007/0193243 | A1* | 8/2007 | Schmidt | A01D 41/14 56/181 |
| 2009/0107098 | A1* | 4/2009 | Priepke | A01D 41/14 56/158 |
| 2009/0288383 | A1* | 11/2009 | Sauerwein | A01D 41/14 56/181 |
| 2011/0099964 | A1* | 5/2011 | Coers | A01D 41/14 56/296 |
| 2011/0308224 | A1* | 12/2011 | Buermann | A01D 41/14 56/296 |
| 2016/0066503 | A1* | 3/2016 | Cook | A01D 34/30 56/257 |

* cited by examiner

PRIOR ART

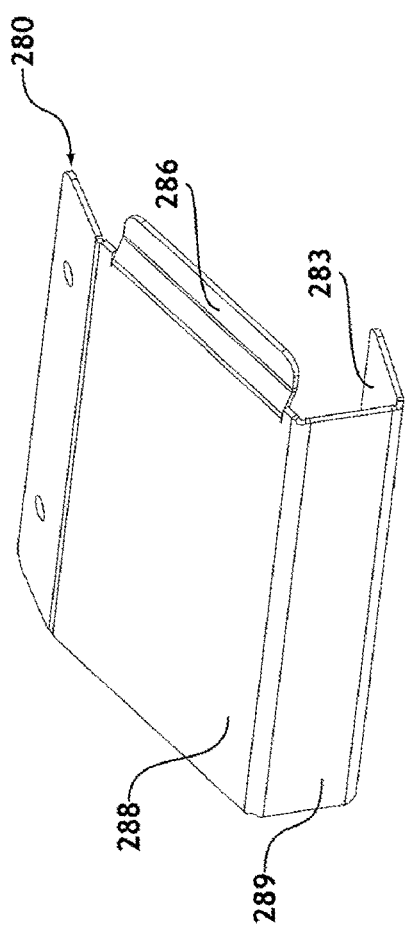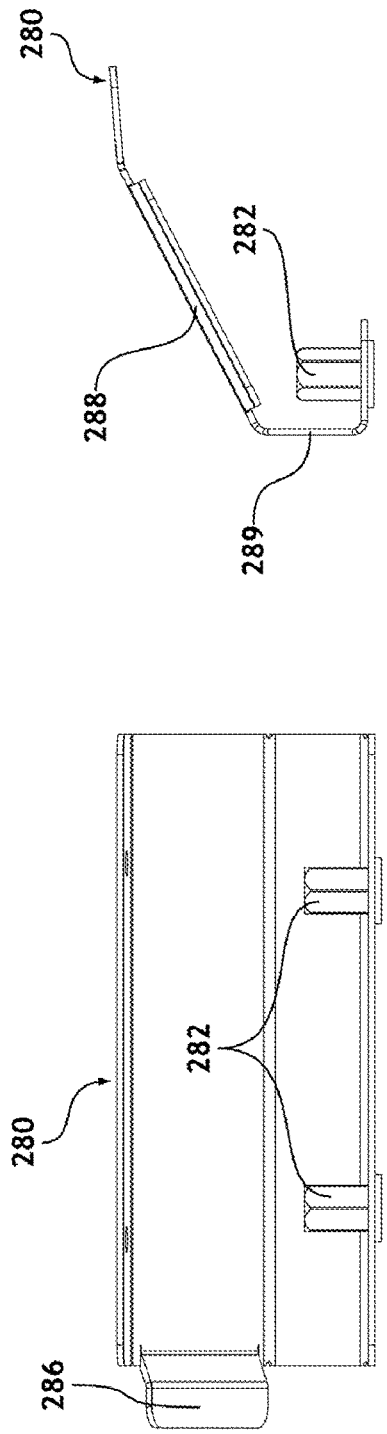

BELT SEALING CROP DEFLECTOR FOR A FLEXIBLE DRAPER PLATFORM

CROSS REFERENCE TO RELATED APPLICATION

This application is a continuation of U.S. application Ser. No. 14/698,133 filed Apr. 28, 2015, entitled, BELT SEALING CROP DEFLECTOR FOR A FLEXIBLE DRAPER PLATFORM, allowed, the disclosure of this application is incorporated herein by reference.

FIELD OF THE INVENTION

The present invention relates to harvesting platforms of the type that are carried on the front end of an agricultural combine. More specifically, it relates to flexible draper platforms having both a flexible cutterbar assembly and a flexible draper assembly that enable the platform to accommodate uneven terrains across the width as it advances through the field.

BACKGROUND OF THE INVENTION

A platform used in agriculture harvesting crops is universally defined as a header attached to a harvesting machine and that serves as a removable attachment for use when cutting requirements are requested. It is made and assembled onto a main frame which is divided into a central section, the area corresponding to coupling with the harvester, and two side sections wings, that projects on either side of said central section according to a perpendicular direction to the advance direction of the harvesting machine. The platform has a cutting mechanism cutterbar projecting laterally across the width thereof, defined in front of the side sections and center section, and is configured to sever the standing crop.

Platforms contain a system for the transverse movement of the crop material. Typically it is formed by a helical screw conveyor and alternately today there exist systems containing a set of canvas or drapers for conveying. Both the canvas draper and the screw conveyor operate to transport the crop cut by the cutterbar and drive it into the center section. Furthermore, it is well known there are multitudes of arrangements where gadgets are used to force the material that reaches the center section of platform to pass through an open end and to the combine's feeder thereof, to be later threshed by the harvester. Each header prefer one of these devices and determine the input mode of the crop material to the feeder of the combine tractor.

It is known that the cutterbar of some cutting platform is configured to flex in response to ground shape. In these, a series of sliding plates skid shoes are linked to said cutterbar to confer the ability to settle above the ground and slipping while operating. All this in view of making the cut of the plant as close to the ground as possible in practice, allowing the collection of those pods with beans sprouting in the lower part of the stem. Thus, when the head is advanced in work, the cutterbar is positioned virtually glued to the ground and curling up to mimic the natural unevenness of the field, resulting into a crop cut at constant height.

Traditional platforms be it platforms using configurations according to prior art technologies implemented for cutting crops such as soybeans, wheat, barley, safflower or beans (among others) usually comprise a conveyor belt on each lateral section which projects forward from the main frame in an oblique downward direction, describing a driving surface for the crop material that extends to the cutterbar, without interruption.

During grain harvesting operations, there is typically a significant amount of crop residue that must be controlled at the platform. If the residue is allowed to migrate into the interior of the draper assemblies, it can become lodged in critical areas and interfere with movement of the draper belts. The problem starts in the transition region between the cutterbar assembly and the front edges of the draper assemblies because the endless loop in the belts present exposed openings to the interior of the belts in that area.

While prior art mechanism use interlocked belt guards in the transition region to cover the open front of the draper belt assemblies against ingress of crop material, it is a challenge to effectively mimic the curved shape of the cutterbar to perfectly seal off the area, particularly considering that the cutterbar assembly and draper assemblies are flexing up and down at various locations.

Other drawback with the crop dam used in flexible cutterbars is the existence of protuberances like bolt ends and nuts that worsen the crop flow. Most prior art crop dam designs are focused to create a good sealing to the draper conveyor while they leave uncovered the fastening item used. In crops like soybean or butter-bean, lower pods tend to be scratched by this protuberances and in severe conditions they open up and release the grains to the floor.

BRIEF DESCRIPTION OF THE DRAWINGS

The drawing figures do not limit the present invention to the specific embodiments disclosed and described herein. The drawings are not necessarily to scale, emphasis instead being placed upon clearly illustrating the principles of the preferred embodiment.

FIG. 11 is a left, front perspective view of an alternative belt guard of the draper assemblies;

FIG. 12 is a rear view thereof;

FIG. 13 is a left end view of the alternative belt guard;

DETAILED DESCRIPTION OF THE EMBODIMENT

Figure 1:
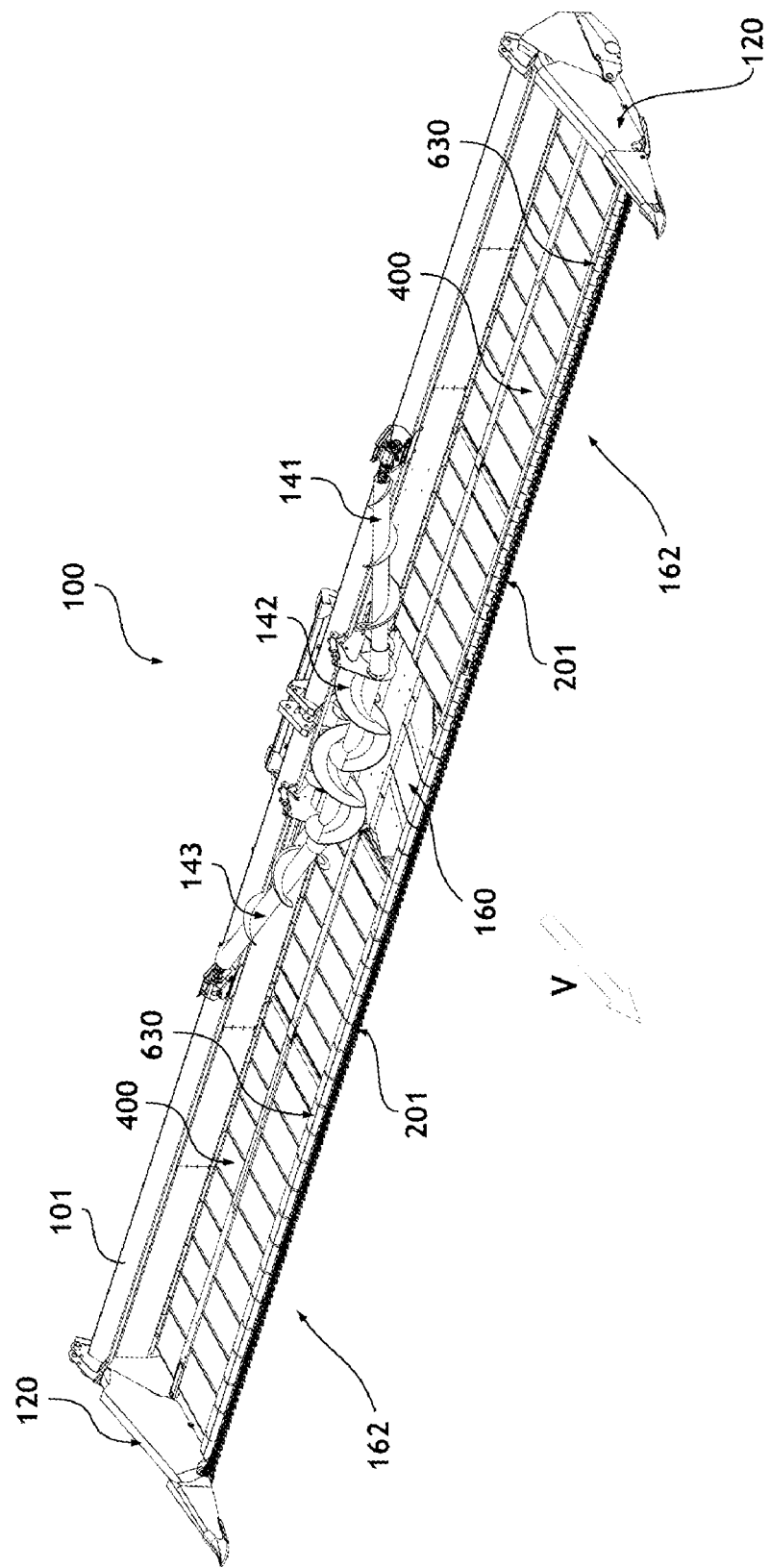
FIG. 1 is a top front perspective view illustrating a platform in accordance with the present invention.
Figure 2:
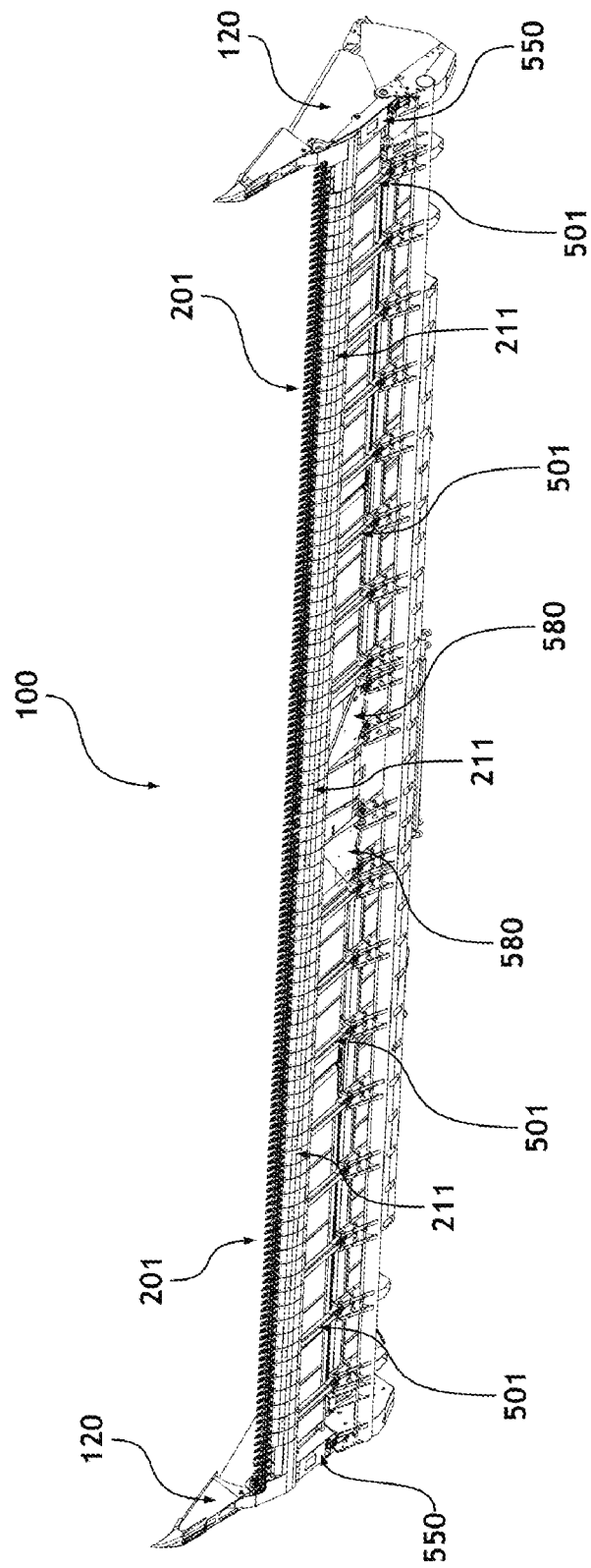
FIG. 2 is a bottom front perspective view of the platform shown in FIG. 1.
Figure 3:
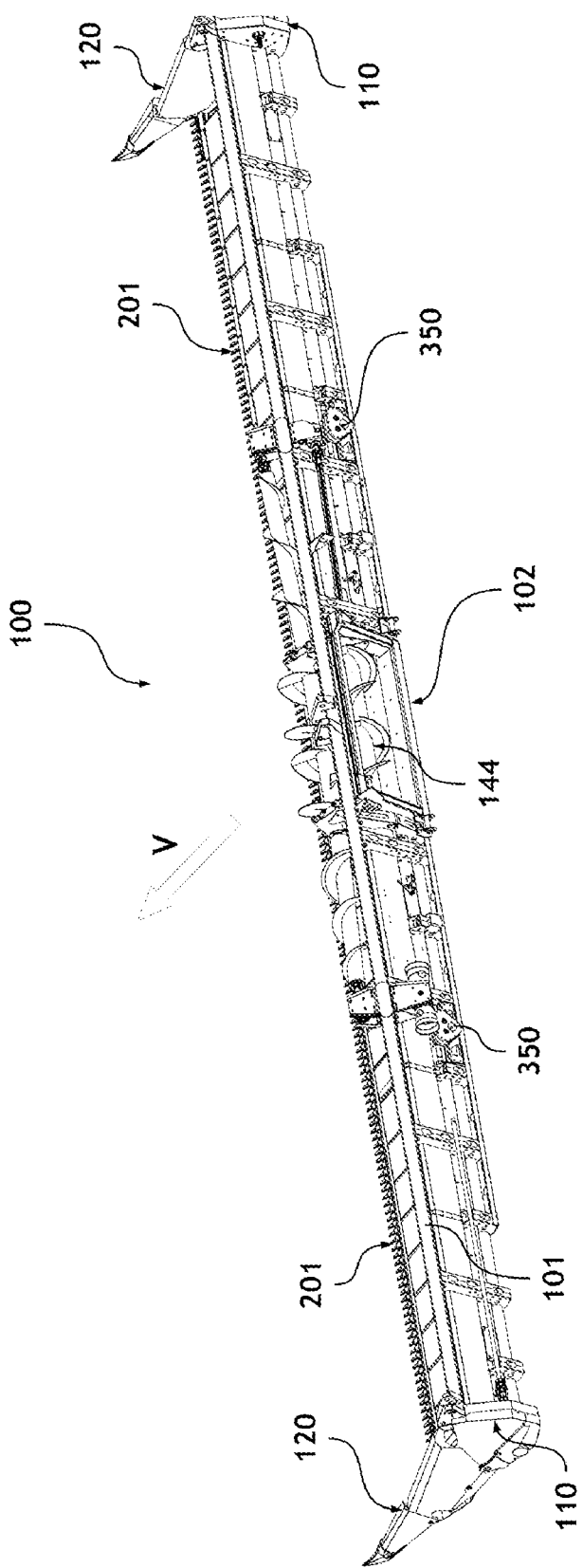
FIG. 3 is a top rear perspective view of the platform shown in FIG. 1.

Referring to FIGS. 1-3, the harvest header selected for illustration comprises a flexible platform 100 used in agricultural machines, preferably combine tractors. The platform 100 is configured to cut and harvest the crop while is advanced in a direction V generally forward so that the material is conveyed to an open end 102 and subsequently processed by other elements (not shown) of the combine tractor (not shown) to finally produce grains.

The platform 100 illustrated generally includes a main frame 101 comprising a central section 160 which projects forwardly from the open end 102, and at least two side sections 162 projecting laterally on either side of said central section 160. All the sections 160, 162 are bounded forwardly by the cutterbar assembly 201 and at the rearward by the main frame 101. Inside side sections 162 there is a set of belt support arms 501 responsible for a holding the cutterbar assembly 201 and responsible for sustain partially the set of belts of a draper conveyor 400. Draper conveyors 400 are responsible for transporting the cut crop from the side sections 162 to the center section 160. The outer lateral limits of the side sections 162 are each defined by a side arm 550, which is configured as the outermost point of support of the cutterbar assembly 201, and is responsible for carrying the transmission mechanism for driving said cutterbar 201. The portion of the cutterbar 201 which corresponds to the central section 160 is supported by at least one central arm 580, thus conferring to the platform 100 the property that its cutterbar assembly 201 is completely flexible, from end to end, from the outer side end of a side section 162 to the outer side end of the other side section 162. The platform 100 also contains a central auger assembly 140 comprising a right oblique auger 143, a left oblique auger 141, a front central auger 142 and a rear central auger 144; furthermore, contains a reel (not shown) extending laterally almost the full width of the platform 100 that operates to push inward standing crop platform 100. Both of the cutterbar assembly 201 and the draper conveyor 400 are preferably flexible so that the platform can work virtually 100 attached to the floor and adapt to the changing curved profile of the terrain when operated through the working direction V.

Figure 4:
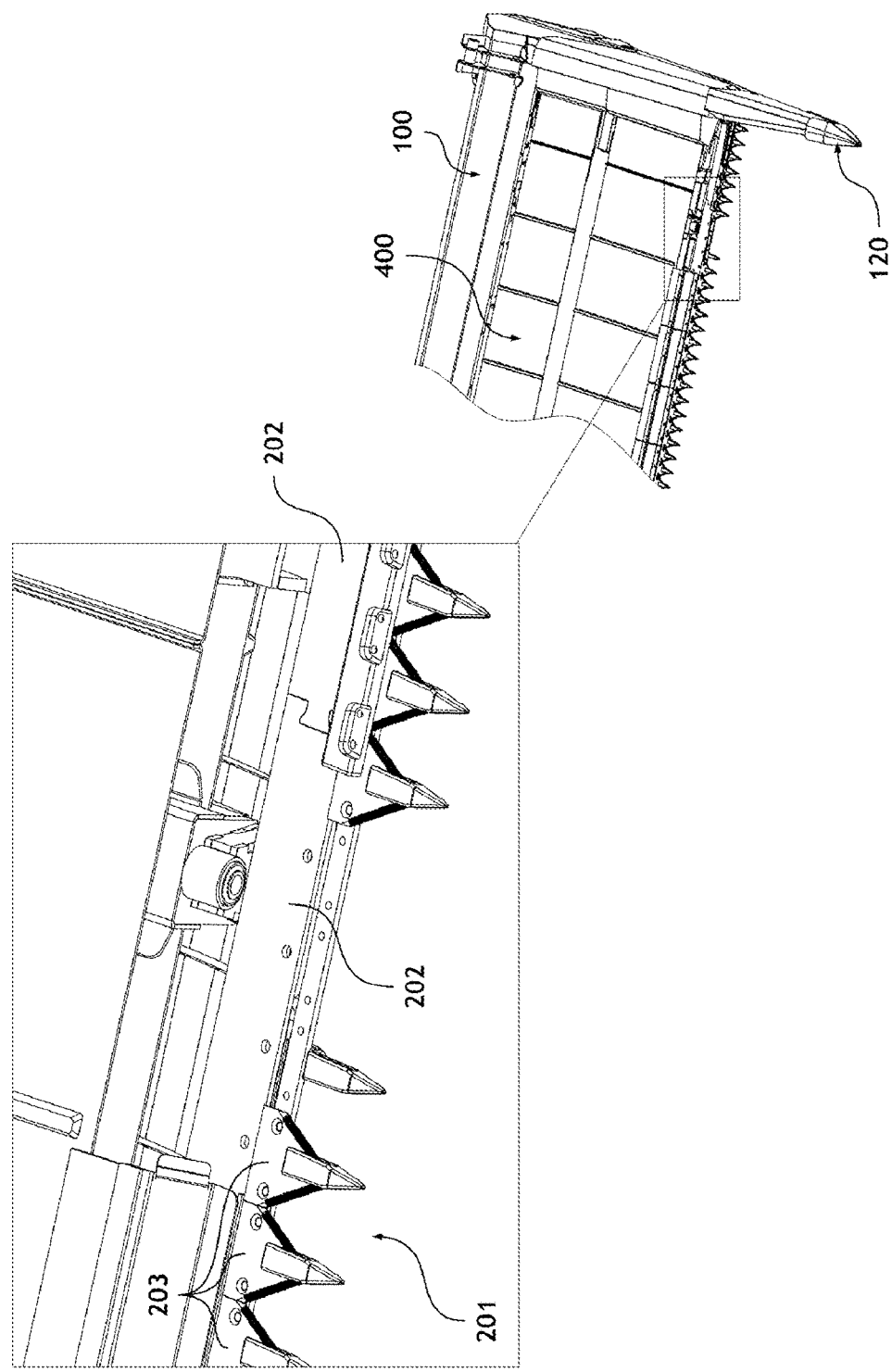
FIG. 4 is a front perspective view, where a portion of the platform illustrated in FIGS. 1-3 is enlarged for greater detail. In this constitution cutterbar assembly is displayed.

Referring now to FIGS. 2 to 4, the platform 100 embodied for representing preferred aspects of the invention also has two wall frames 110 configured as the laterally outermost sections of the main frame 101. The cutterbar assembly 201 comprises in general a flexible bar 202, a plurality of friction plates 211 fastened to said flexible bar 202 and arranged laterally one beside the other, also comprises two outer friction plates 221 attached to the lateral ends of said side plate section 202, comprises at least one sickle bar assembly 203 containing a plurality of saws and configured to be actuated in a linear alternating motion to severe crop. Likewise, the platform 100 may comprise some other parts (not shown) whose inclusion does not affect spirit and scope of the invention as defined by the claims set forth hereinafter.

The platform 100 cited in the present invention is configured such that when advanced in the direction V, it erects and directs the crop with the reel (not shown) towards the draper conveyors 400 while cutting it via the cutterbar assembly 201. The cut crop falls onto the draper conveyor 400 and is carried to the central section 160 of the platform 100, where the set of augers 140 finally pushes it across the open end 102 to be subsequently treated by a threshing machine (not shown).

Belt Sealing Crop Deflector

Figure 5:
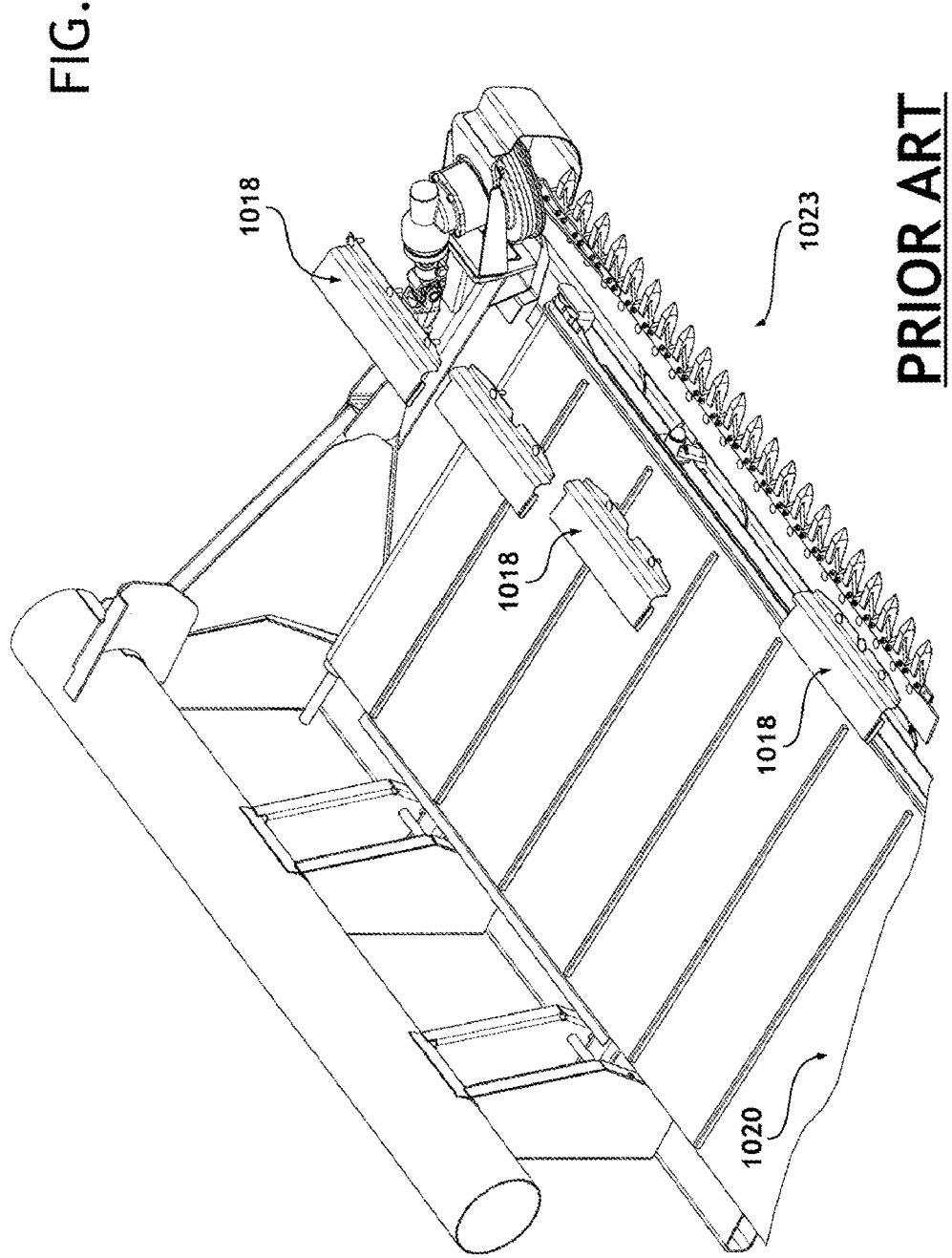
FIG. 5 is a top front perspective view of a prior art draper platform showing rigid interlocked belt guarding crop deflectors.

FIG. 5 shows a prior art belt sealing guard 1018. This prior art headers include a plurality of interlocking belt guards 1018 extending along the cutterbar. Each belt guard 1018 is preferably unitary and comprises a formed piece of sheet metal or sheet plastic. This belt guards generally include a (a) lower flange section used to fasten the guard to the cutterbar, (b) an upright section configured as a dam over which the crop material slides, and (c) an upper overhanging section that projects rearward to overlap a front margin and seal the side draper belts 1020. The belt guard 1018 also includes a side tabs on the (b) upright section and the (c) upper overhanging section to interlock with the adjacent belt guards. When the cutterbar flexes up and down, the (c) upper overhanging sections must curve up to follow the side belt's front margin flexion. Due to the material's difference of flexibility between the belt guards and the side drapers, this prior art guards are not effective to mimic the curved shape of the side drapers to perfectly seal off the area between the upper and the lower runs.

Figure 6:
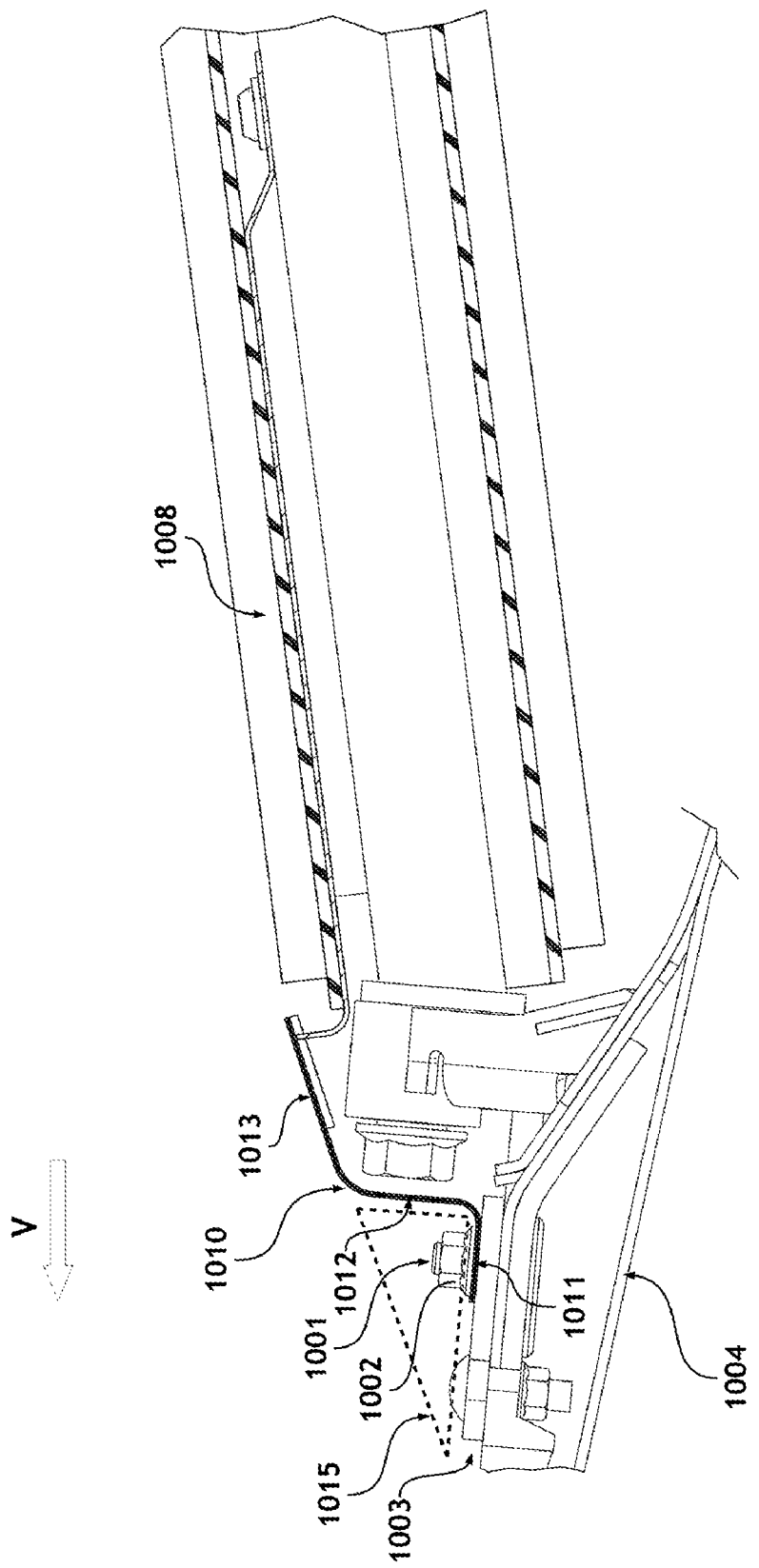
FIG. 6 is a fragmentary side view of a prior art draper platform being cross-sectioned at the cutterbar region to show the crop dam between the side draper and cutterbar assembly.

FIG. 6 shows a prior art crop deflector 1010. This crop deflectors generally include a lower flange section 1011 used to fasten the guard to the cutterbar, an upright section 1012 configured as a dam over which the crop material slides, and an upper overhanging section 1013 that projects rearward to overlap a front margin and seal the side draper belts 1008. This crop deflectors are mounted to the cutterbar 1003 using fasteners that leave upright end protuberances 1001. Moreover, due to the shape of the crop deflectors 1010, there exists a recess region 1015 between the cutterbar 1003 and the upper overhanging section 1013 that worsen the crop material flow to the side drapers and tend to accumulate crop residues and, in severe conditions, damage the crop pods and loose grains.

Figure 7:
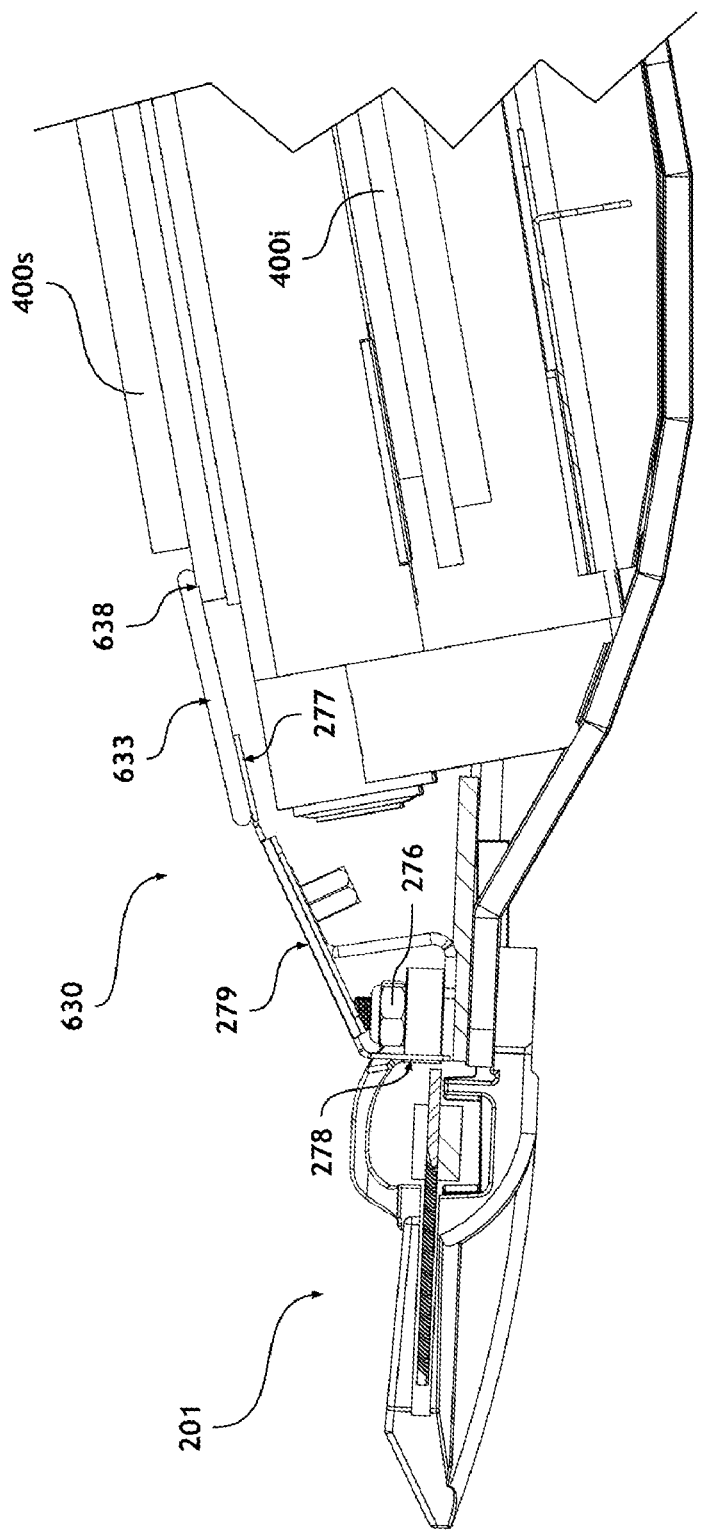
FIG. 7 is a fragmentary side view of the platforms shown in FIGS. 1-4, with the header being cross-sectioned to show belt sealing crop deflector between the side draper and cutterbar assembly.
Figure 8:
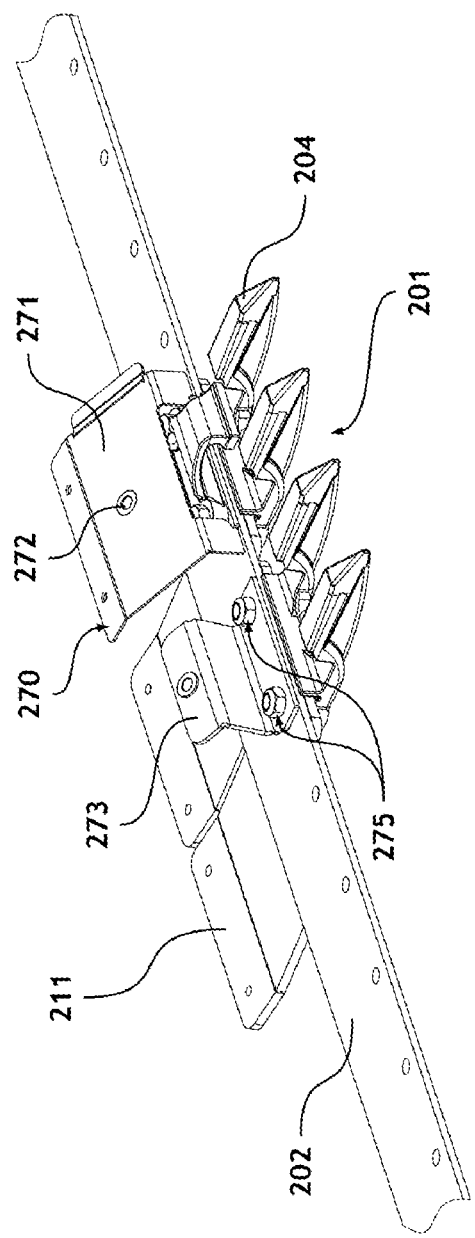
FIG. 8 is a fragmentary front perspective of the harvesting header shown in FIGS. 1-4, showing the cutterbar assembly and an alternative embodiment of the crop deflector.

Turning initially to FIGS. 7-8, the platform 100 further includes on each section 162 a belt sealing crop deflector assembly 630. The belt sealing crop deflector assembly 630 comprises a plurality of articulated crop deflectors 270 mounted to the cutterbar assembly 201 and a belt strap 633 joint to the firsts extending rearwards. Each crop deflector 270 is made up of a first base plate 273 fixed to the cutterbar 201 using bolts 275 and of a second slip plate 271 pivotally coupled to the first using a rotary joint 272. When the cutterbar 201 flexes up and down, the slip plates 271 are free to accommodate small movements by the angular movement at the joint 272.

Each slip plate 271 is preferably unitary and comprises a formed piece of sheet metal or sheet plastic. This slip plate 271 generally include an upright wall section 278 projecting upwards from the cutterbar flexible substrate 202, an upper overhanging section 279 projecting up and rearwards, and an upper flange 277 that holds the belt strap 633. This belt strap is made of a resilient rubber material and projects rearwards to overlap a front portion 638 of the upper run 400s of the side belt conveyor 400. In a preferred configuration, the belt strap is set to extend across the full length of the corresponding side section 162 in a single piece.

Figure 9:
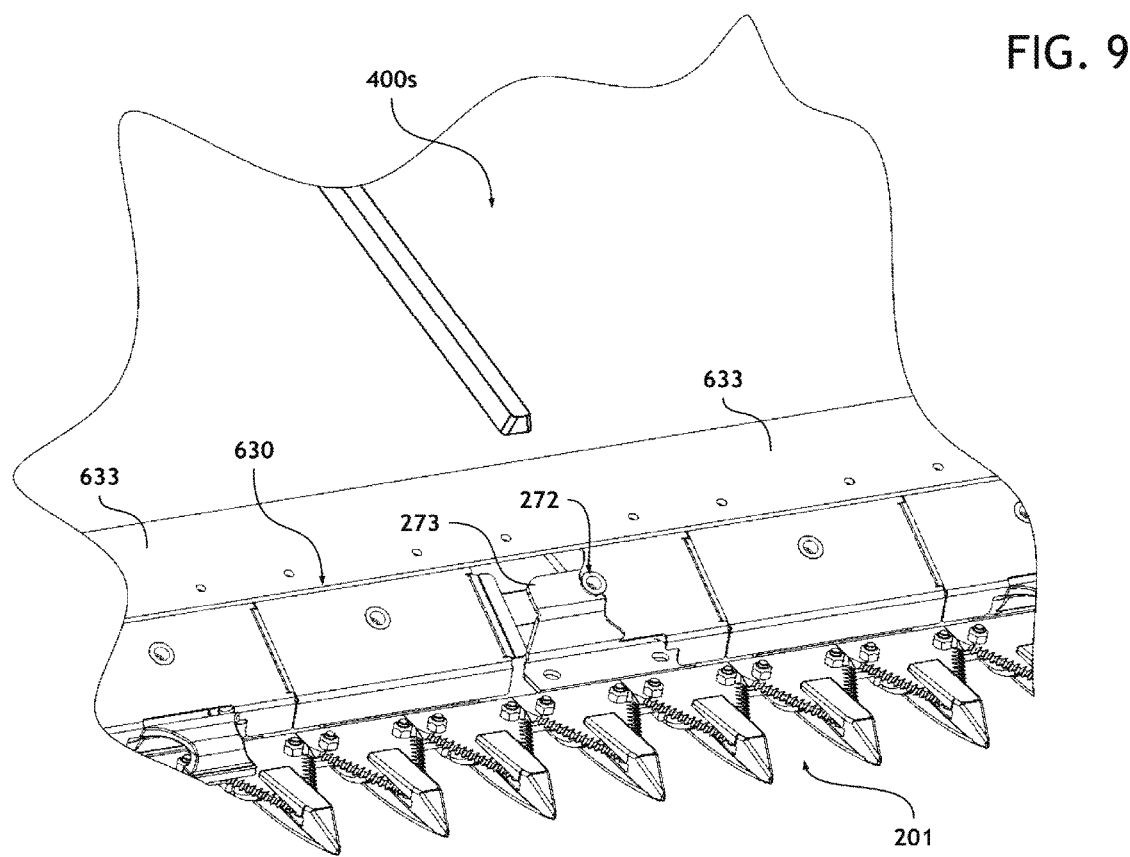
FIG. 9 is a fragmentary front perspective of the harvesting header shown in FIGS. 1-4, showing the embodiment of the crop deflector from FIG. 7 with the sealing strap and the upper run of the side draper belt.

As it could be understood from FIGS. 7-9, when the cutterbar 201 curls up to mimic the natural unevenness of the field the set of slip plates 271 do a first accommodation of the belt sealing crop deflector assembly 630 using rotary joint 272, and then the resilient belt strap does a second accommodation by flexing to perfectly seal the area between the upper run 400s on the belt conveyor 400. Furthermore, the uppermost surfaces presented by the belt strap 633 is substantially flush with the uppermost surfaces presented by the upper run 400s and thereby minimize any resistance to crop flow. As it will be discussed later, the lower run 400i is protected against the ingress of crop material residues by the use of a special support panel.

Figure 10:
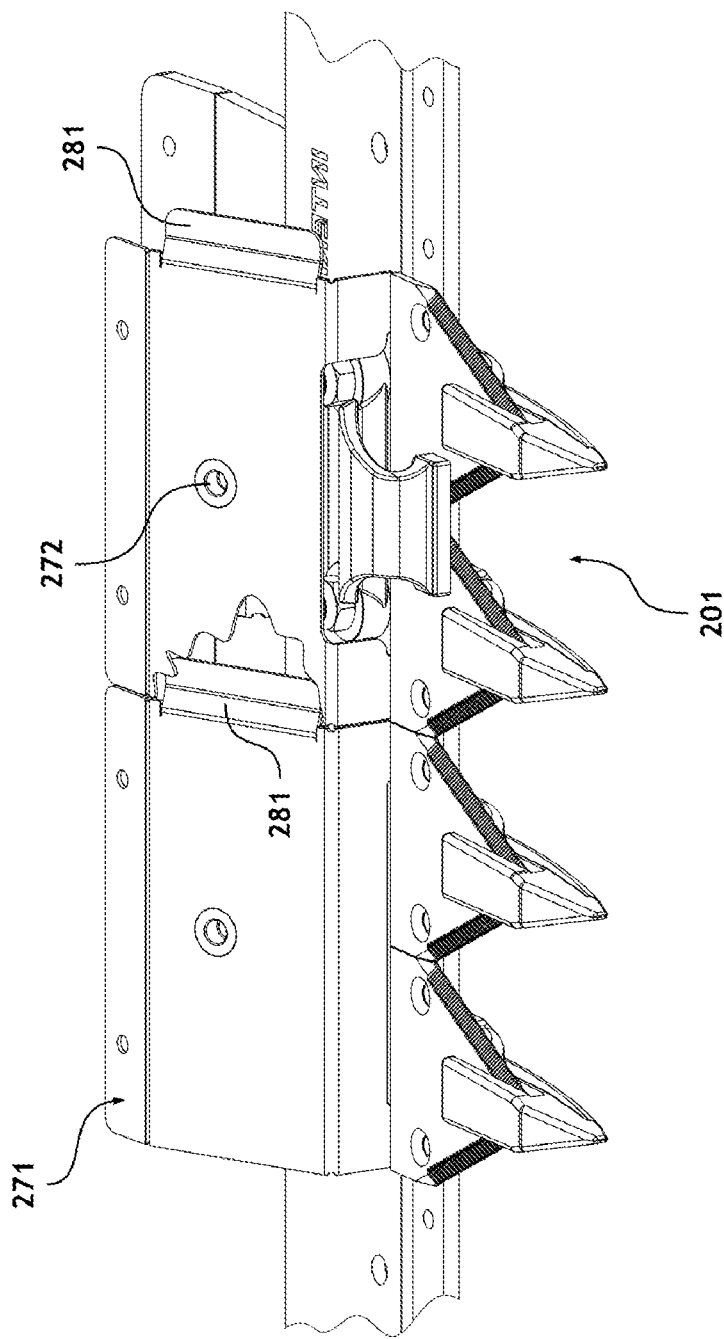
FIG. 10 is a top front perspective view of the crop deflector shown in FIGS. 7-9, that reveals the relationship between two adjacent crop deflectors and the overlapping flange.
Figure 14:
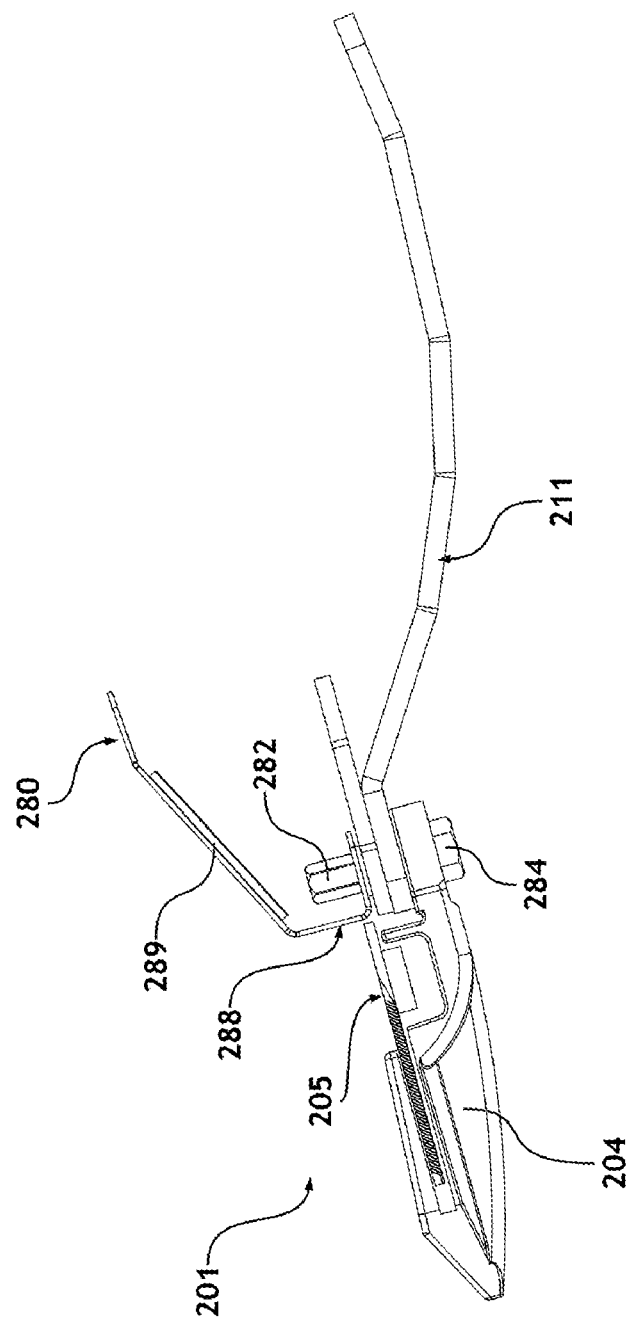
FIG. 14 is a fragmentary side view of the platforms shown in FIGS. 1-4, with the header being cross-sectioned to show the alternative crop deflector revealed in FIGS. 11-13 and cutterbar assembly.

Turning now to FIG. 10, it is shown how the pairs of articulated crop deflectors 270 can be mated to each other by positioning the lateral tab 281 of one slip plate 271 underneath the overhanging section of the adjacent articulated crop deflector 270. Then, the interlocking joint preferably permits relative angular movement between mated pairs of articulated crop deflectors 270 while it forbids the ingress of crop residue beyond the slip plates 271.

Alternative Embodiment for Belt Sealing Crop Deflector

Turning now to FIGS. 11-14, the crop deflectors 270 of the belt sealing crop deflector assembly 630 can be me made up of a single sheet metal. This sheet metal comprises a lower flange 283 projecting rearwards used as the mounting flange to the cutterbar 201; an upright wall frame 289 that goes up surpass the protuberances 276 height; a rearward projecting slipping face 288 to deflect the crop flow to the side drapers 400; and an upper flange 280 to join the belt strap 633. This crop deflector has fixed threaded nuts 282 on the lower flange 283 that allow each plate to be mounted to the cutterbar 201 from bellow, i.e., using the same bolts 284 by which the fingers 204 are fixed to the cutterbar. also, this embodiment may include a lateral tab 286 on one side of the plate to permit consecutives plates to be mated to each other. While this configuration does not have as much tolerance as the previous embodiment to accommodate to the flex of the cutterbar 201, it is a much simpler alternative that may save labor time when servicing the cutterbar.

Belt Support Panel for Crop Residue Deflection

Figure 15:
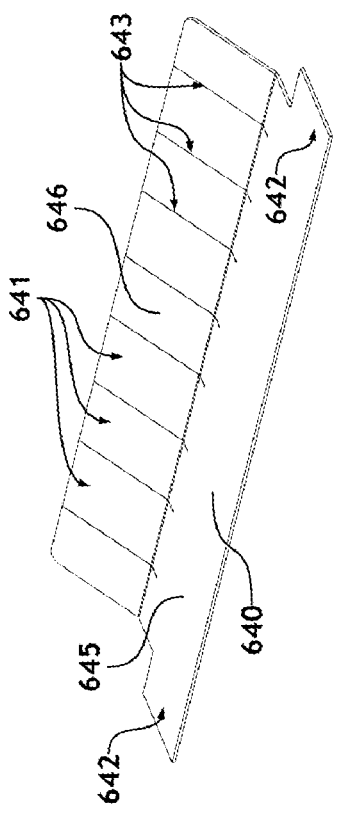
FIG. 15 is a left, front perspective view of the belt support panel.

Turning first to FIG. 15, it is shown a lower run belt support panel 640. The platform 100 also comprises multiple of this panels to support the lower runs of the draper conveyor 400. This lower run belt support panels 640 are made up of an elongated strip of metal or plastic that extends between opposite ends 642 thereof. The panels 640 each include a flat support section 645 and an upper overhanging section 646.

Figure 16:
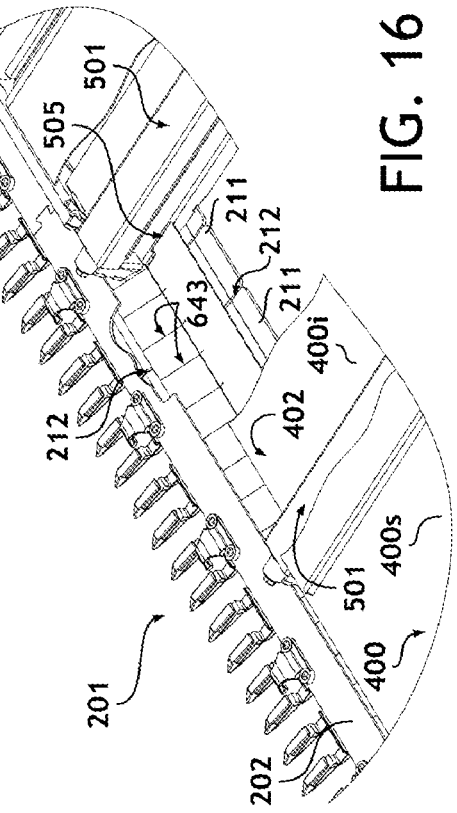
FIG. 16 is a fragmentary rear perspective view of the harvesting header shown in FIGS. 1-4, showing the disposition of the belt support panel on the platform.

As it can be seen in FIGS. 15-16, the upper overhanging sections 646 project up and forward against the slip plates 211 to cover the separation 212 between two adjacent slip plates 211. In a preferred configuration, the upper overhanging sections 646 comprise thin slots 643 that divides it into multiple sheet strips 641.

The platform 100 also includes one lower run belt support panel 640 between each two adjacent belt support arms 501. The panels 640 are slotted to an opening 505 in the forward margin of the belt support arm 501 using the side ends 642.

The flat support sections 645 of the panels 640 are operable to support the front margin 402 of the lower runs 400i when part of the lower run 400i sags from the tensioned belt condition. It easy to understand that the tensioned belts of the draper conveyor 400 loses tension over time. Thus, as the belt loses tension, a central portion of the lower run 400i can sag below the tensed position of the lower run 400i. As the lower run sags, the flat support sections 645 are operable to engage the sagging belt run.

The upper overhanging sections 646 of the panels 640 are operable to stop the ingress of crop material residue to the interior of the draper conveyors 400 across the separations 212 of two adjacent slip plates 211. Each upper overhanging section 646 projects up and forward to the slip plates 211 screening the separations 212. In a preferred configuration, each upper overhanging section 646 is partially cut laterally thus generating multiple sheet strips 641. The strips 641 are operable to increase the flexibility of the lower run belt support panel 640, thus when adjacent belt support arms 501 are requested to swing up and down the belt support panels 640 offers almost no force against the movement. The slots 643 also provide better accommodation capabilities for the upper overhanging section 646 to the shape of the cutterbar 201 and the slip plates 211 when flexing. It is also important to notice that no slot 643 matches the position of the separation 212 between two adjacent slip plates 211.

The preferred forms of the invention described above are to be used as illustration only, and should not be utilized in a limiting sense when interpreting the scope of the present invention. Some alterations to the exemplary embodiments described above could be readily made by those skilled in the art without departing from the spirit of the present invention.

The inventor hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An agricultural platform (100) used to harvest crops, said platform operable to be supported at an open end that is configured to receive severed crop materials, said platform comprising:

a main frame (101) operable to be mounted to the open end (102), said main frame comprising a central section (160) located adjacent to said open end, and comprising right and left lateral sections (162) at the sides of said central section extending transversely with respect to the normal direction of travel (V) of the platform;

a plurality of arms (501) pivotally coupled to the main frame (101) to pivot up and down at their forward ends with respect to said main frame (101), wherein each of said arms extend in a forward direction;

a cutterbar assembly (201) to extend lengthwise through said lateral and central regions; said cutterbar assembly being operable to flex along the length thereof in response to changes in terrain as the platform is advanced;

front ends of said arms (501) being attached to and cooperatively supporting the cutterbar assembly (201);

a draper conveyor assembly (400) comprising lateral belt conveyors disposed behind the cutterbar assembly to flex therewith; said draper conveyor assembly being supported on the lateral sections (162) to convey cut crop material laterally inwardly toward the central section (160);

said lateral belt conveyors presenting a foremost margin; and at least two belt sealing crop deflectors (630) attached relative to the cutterbar assembly (201) at the lateral sections (162) to accommodate and move with the cutterbar assembly during flexing thereof;

each of the belt sealing crop deflectors (630) extending rearward from the cutterbar assembly (201) to a location overhanging the foremost margin of the lateral belt conveyors;

each of said belt sealing crop deflectors including a plurality of crop deflector plates (270); each of said crop deflector plates presenting an upright wall (278) and a fore-and-aft wall (288) slanting from and being integrally formed with the upright wall, with the fore-and-aft wall (279) extending rearward from the upright wall to a region in front of the foremost margin of the corresponding belt conveyor; said fore-and-aft wall presenting a rear end;

each of said belt sealing crop deflectors including a belt strip (633) to extend lengthwise through the lateral section; said belt strip being cooperatively supported by the crop deflector plates to project rearward from the rear end of the fore-and-aft walls to overlap the foremost margin of the corresponding lateral belt conveyor;

said cutterbar assembly (201) comprises a flexible substrate (202) configured as carrier member;

said cutterbar assembly comprises a plurality of guide fingers (204) operable to divide standing crop;

said cutterbar assembly further comprises a plurality of slip plates (211) operable to cover a bottom aspect of the cutterbar;

said cutterbar assembly further comprises a plurality of fastening elements (284, 275) configured to attach said plurality of guide fingers and said plurality of slip plates to said flexible substrate;

said fastening elements projecting upward from the flexible substrate to determine protuberances (276);

the upright wall (278) of each crop deflector plate (270) being placed ahead of said fastening elements;

said crop defector plates (270) providing a smooth upper surface that covers all the protuberances (276) projecting up from the cutterbar assembly.

* * * * *